(12) United States Patent
Cheng (10) Patent No.: US 11,951,663 B2
(45) Date of Patent: Apr. 9, 2024

(54) BALL SCREW CENTERING DEVICES FOR INJECTION MOLDING APPARATUSES

(71) Applicant: DME Company LLC, Madison Heights, MI (US)

(72) Inventor: Peng Cheng, Troy, MI (US)

(73) Assignee: DME Company LLC, Madison Heights, MI (US)

(*) Notice: Subject to any disclaimer, the term of this patent is extended or adjusted under 35 U.S.C. 154(b) by 0 days.

(21) Appl. No.: 17/859,055

(22) Filed: Jul. 7, 2022

(65) Prior Publication Data

US 2023/0011732 A1   Jan. 12, 2023

Related U.S. Application Data

(60) Provisional application No. 63/220,032, filed on Jul. 9, 2021.

(51) Int. Cl.
*B29C 45/32* (2006.01)
*B29C 45/26* (2006.01)

(52) U.S. Cl.
CPC .......... *B29C 45/2606* (2013.01); *B29C 45/32* (2013.01)

(58) Field of Classification Search
None
See application file for complete search history.

(56) References Cited

U.S. PATENT DOCUMENTS

| 6,106,265 | A | 8/2000 | Von Holdt |
| 7,547,207 | B2 | 6/2009 | Berceanu et al. |
| 2009/0136611 | A1 | 5/2009 | Eigler |
| 2009/0304841 | A1 | 12/2009 | Eigler et al. |
| 2013/0323349 | A1 | 12/2013 | Plumpton |

FOREIGN PATENT DOCUMENTS

KR    20010091541 A  *  10/2001  ............. B29C 45/66

OTHER PUBLICATIONS

Kim KR20010091541A English Translation 2001 (Year: 2001).*

* cited by examiner

*Primary Examiner* — Jacob T Minskey
*Assistant Examiner* — Adrien J Bernard
(74) *Attorney, Agent, or Firm* — Dinsmore & Shohl LLP (57) ABSTRACT

An injection molding apparatus including a stack mold tool and a ball screw centering device. The stack mold tool including a stationary mold block, a center mold block movable relative to the stationary mold block, and a distal mold block movable relative to the center mold block. The ball screw centering device includes a center bearing housing connected to the center mold block, a rotatable shaft having a first side ball track and a second side ball track, a first nut coupled to the stationary mold block, the first nut including a track portion cooperating with the first side ball track to define a passage for a first set of ball bearings, and a second nut coupled to the distal mold block, the first nut including a track portion cooperating with the second side ball track to define a passage for a second set of ball bearings.

20 Claims, 5 Drawing Sheets

BALL SCREW CENTERING DEVICES FOR INJECTION MOLDING APPARATUSES

CROSS-REFERENCE TO RELATED APPLICATION

This application claims the benefit of co-pending U.S. Provisional Patent Application No. 63/220,032, filed Jul. 9, 2021, for "Ball Screw Centering Device," which is hereby incorporated by reference in its entirety including the drawings.

TECHNICAL FIELD

The present specification generally relates to injection molding systems and, more specifically, centering devices for injection molding stack molds.

BACKGROUND

In the injection molding field, it is desirable to form parts at high volume in the shortest amount of time. One of the ways to increase volume is to develop mold tools that have many forming cavities, thereby allowing several parts to be formed simultaneously during a single mold cycle. In response to this need, a certain type of mold, commonly referred to as a stack mold, has been developed where there are several mold blocks, sometimes referred to as "stacks", that provide forming cavities on two different sides of a mold tool. During production, the mold blocks will pull apart to be positioned in an open position so as to expose the forming cavities so that finished products can be removed from the mold blocks. The mold blocks then slide back to a closed position to start a new injection molding cycle to form new parts.

The movement of the mold blocks between the open position and the closed position is typically accomplished using toggle arms, rack and pinion gears, or worm gear systems. However, these systems can be complex and require custom formed parts. Additionally, the movement of these systems can be cumbersome due to the amount of weight being moved. It is desirable to provide a simpler system that can be easily customized for molds of different sizes. It is also desirable to create a system that provides more precise movements and has reduced friction so that the movement of the mold components is more fluid and less cumbersome.

SUMMARY

In one embodiment, an injection molding apparatus includes: a stack mold tool including: a stationary mold block; a center mold block movable between an open position and a closed position relative to the stationary mold block; and a distal mold block movable between an open position and a closed position relative to the center mold block; and a ball screw centering device including: a center bearing housing connected to the center mold block; a rotatable shaft extending through a channel of the center bearing housing and rotatably mounted to the center bearing housing, the rotatable shaft having a first side ball track and a second side ball track; a first nut coupled to the stationary mold block, the first nut including a track portion cooperating with the first side ball track to define a passage for a first set of ball bearings to traverse; and a second nut coupled to the distal mold block, the second nut including a track portion cooperating with the second side ball track to define a passage for a second set of ball bearings to traverse.

In another embodiment, a ball screw centering device includes: a center bearing housing to be connected to a center mold block; a rotatable shaft extending through a channel of the center bearing housing and rotatably mounted to the center bearing housing, the rotatable shaft having a first side ball track and a second side ball track; a first nut to be coupled to the stationary mold block, the first nut including a track portion cooperating with the first side ball track to define a passage for a first set of ball bearings to traverse; and a second nut to be coupled to the distal mold block, the first nut including a track portion cooperating with the second side ball track to define a passage for a second set of ball bearings to traverse.

In yet another embodiment, a method includes: translating a distal mold block of a stack mold tool in a first longitudinal direction to rotate a rotatable shaft of a ball screw centering device coupled to the stack mold tool in a first rotation direction, wherein: a first nut housing of the ball screw centering device is fixed to a stationary mold block of the stack mold tool; a center bearing housing of the ball screw centering device is fixed to a center mold block of the stack mold tool; and a second nut housing of the ball screw centering device is fixed to the distal mold block of the stack mold tool.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to an injection molding apparatus and ball screw centering device for moving a center mold block relative to a stationary mold block, and a distal mold block relative to the center mold block to simultaneously form and remove two injection molded parts being formed. Various embodiments of the injection molding apparatus and ball screw centering device and the operation of the injection molding apparatus and ball screw centering device are described in more detail herein. Whenever possible, the same reference numerals will be used throughout the drawings to refer to the same or like parts.

Figure 1:
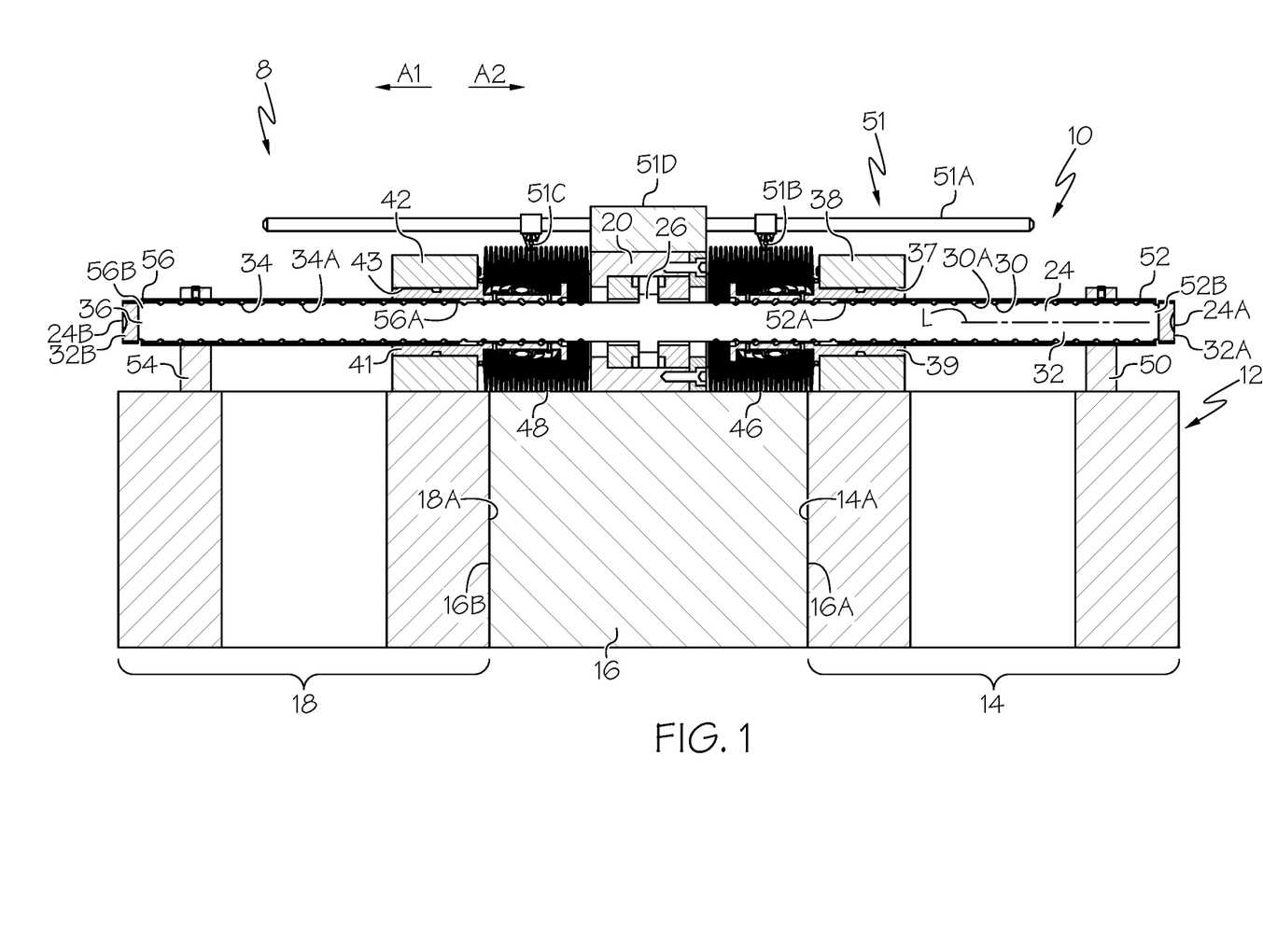
FIG. 1 schematically depicts a cross-section elevation view of injection molding apparatus including a ball screw centering device and a stack injection molding tool in a closed position, according to one or more embodiments shown and described herein.
Figure 2:
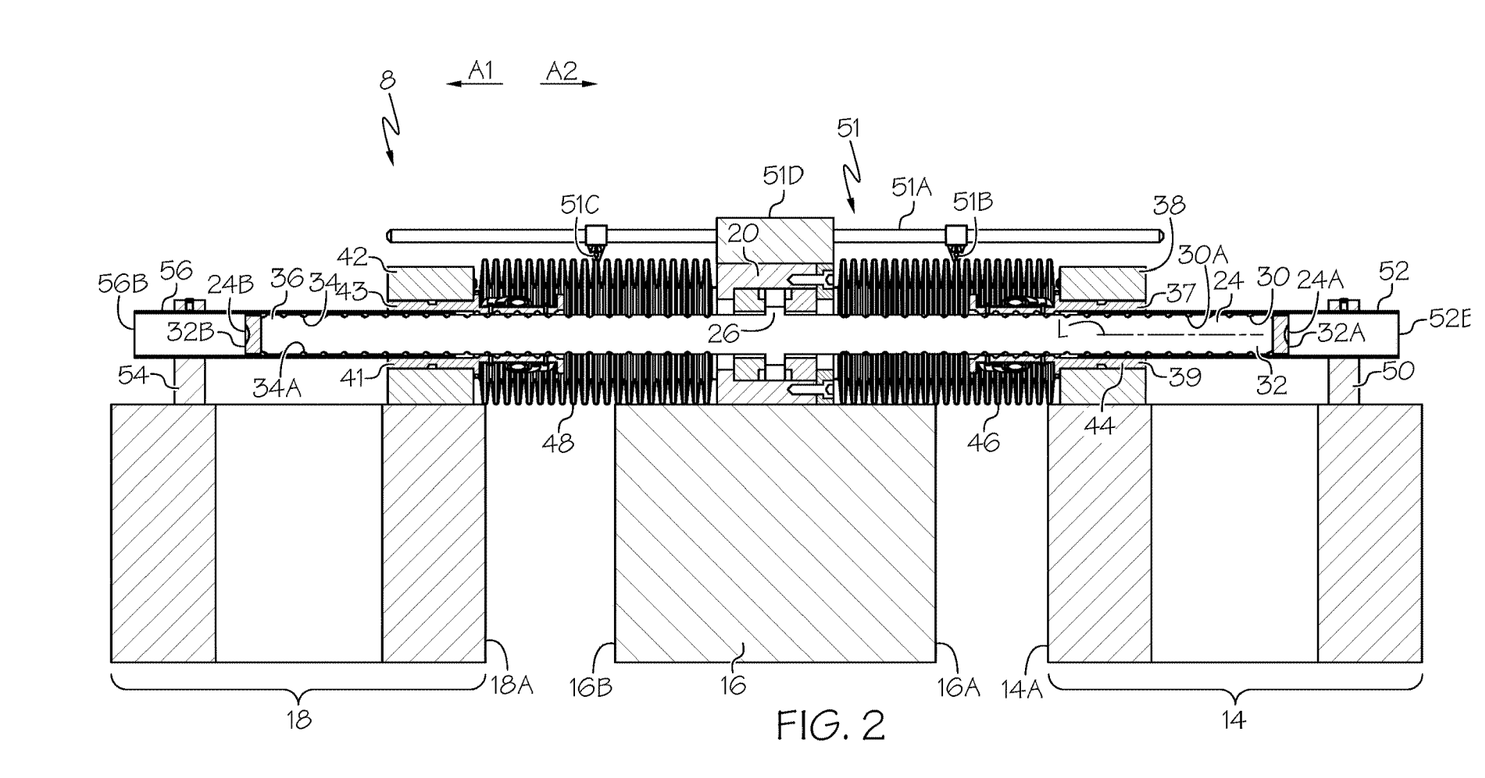
FIG. 2 schematically depicts a cross-section elevation view of the injection molding apparatus in an open position, according to one or more embodiments shown and described herein.

Referring now to FIGS. 1 and 2, an injection molding apparatus 8 is illustrated according to one or more embodiments described herein. The injection molding apparatus 8 may generally include a ball screw centering device 10 and a stack mold tool 12 positionable between a closed position (FIG. 1) and an open position (FIG. 2). While the ball screw centering device 10 is disclosed as being used in combination with the stack mold tool 12 described herein, it is within the scope of the present disclosure for the ball screw centering device 10 to be used in connection with virtually any other type of mold tool depending on the needs of a particular operation. Although referred to herein as a ball screw centering device 10, the ball screw centering device 10 may also be referred to as a timing device for timing the movement and spacing of a center mold block 16 and a distal mold block 18, as discussed herein. Also, in normal use, the stack mold tool 12 may include two ball screw centering devices 10, one on each side of the stack mold tool 12. Although the current disclosure describes one ball screw centering device 10, it should be appreciated that the description is applicable to both ball screw centering devices 10.

The stack mold tool 12 includes a stationary mold block 14 that does not move, a center mold block 16 that moves between a closed position (FIG. 1) and an open position (FIG. 2) relative to the stationary mold block 14, and a distal mold block 18 that moves between a closed position (FIG. 1) and an open position (FIG. 2) relative to the center mold block 16. As described in more detail herein, the center mold block 16 and the distal mold block 18 move in the direction of arrow A1 when moving from the closed position to the open position, and in the direction of arrow A2, which is opposite the direction of arrow A1, when moving from the open position to the closed position. It should be appreciated that the directions of arrow A1 and arrow A2 extend parallel to a longitudinal axis L of the ball screw centering device 10.

The center mold block 16 has at least one injection port and a pair of first mold halves 16A, 16B used for forming a portion of a molded part. The first mold halves 16A, 16B of the center mold block 16 are provided on opposite sides of the center mold block 16. The stationary mold block 14 and the distal mold block 18 each has a second mold half 14A, 18A, respectively, that each correspond to a respective one of the first mold halves 16A, 16B on the center mold block 16. It should be appreciated that the first mold halves 16A, 16B of the center mold block 16 form a first half or portion of the molded part, while the second mold halves 14A, 18A of the stationary mold block 14 and the distal mold block 18 form a second half or portion of the molded part.

Figure 3:
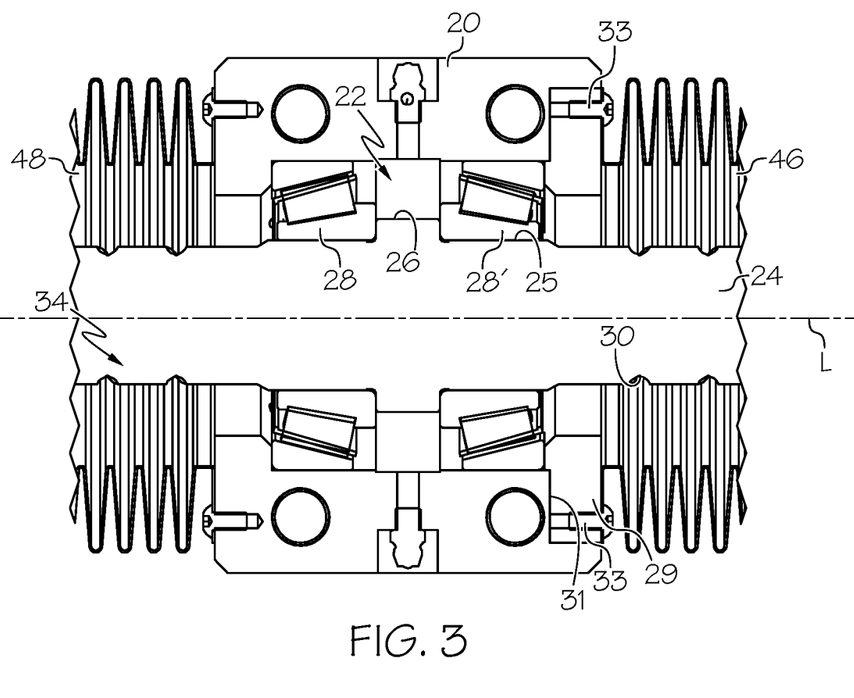
FIG. 3 schematically depicts an enlarged cross-section view of a center bearing housing of the ball screw centering device, according to one or more embodiments shown and described herein.

The ball screw centering device 10 includes a center bearing housing 20 connected to the center mold block 16. As shown in FIG. 3, the center bearing housing 20 includes a channel 22 extending through the center bearing housing 20. A rotatable shaft 24 extends through the channel 22 of the center bearing housing 20 and defines the longitudinal axis L of the ball screw centering device 10. The rotatable shaft 24 has a center flange 26 positioned in the channel 22 of the center bearing housing 20. The center flange 26 extends radially from the rotatable shaft 24 and is positioned between two roller bearings 28, 28' that abut against an outer surface 25 of the rotatable shaft 24 adjacent the center flange 26. The center bearing housing 20 may include an opening to permit the rotatable shaft 24 and the roller bearings 28, 28' to be inserted into the center bearing housing 20. Specifically, the center bearing housing 20 may have a cover 29 removably attached to an open end 31 of the center bearing housing 20 by one or more fasteners 33. Removing the fasteners 33 and the cover 29 allows for the roller bearings 28, 28' to be inserted into the channel 22 of the center bearing housing 20 with the center flange 26 of the rotatable shaft 24 positioned therebetween, and then securing the roller bearings 28, 28' and the center flange 26 within the channel 22 of the center bearing housing 20 by securing the cover 29 against the open end 31 of the center bearing housing 20 with the fasteners 33.

Referring again to FIGS. 1 and 2, the rotatable shaft 24 includes a first side ball track 30 that is formed within and extends along the outer surface 25 of the rotatable shaft 24 from adjacent the center flange 26 to a first end 32 of the rotatable shaft 24. The first side ball track 30 extends across a portion of the stationary mold block 14. The first side ball track 30 is defined by a spiral groove 30A extending or spiraling in a first angular direction with an upper end of the spiral groove 30A oriented toward the center bearing housing 20. A second side ball track 34 is formed within an extends along the outer surface 25 of the rotatable shaft 24 from adjacent the center flange 26 to a second end 36 of the rotatable shaft 24 opposite the first end 32 of the rotatable shaft 24. The second side ball track 34 extends across a portion of the distal mold block 18. The second side ball track 34 is defined by a spiral groove 34A extending or spiraling in a second angular direction with an upper end of the spiral groove 34A oriented toward the center bearing housing 20 and opposite the first angular direction.

Figure 4:
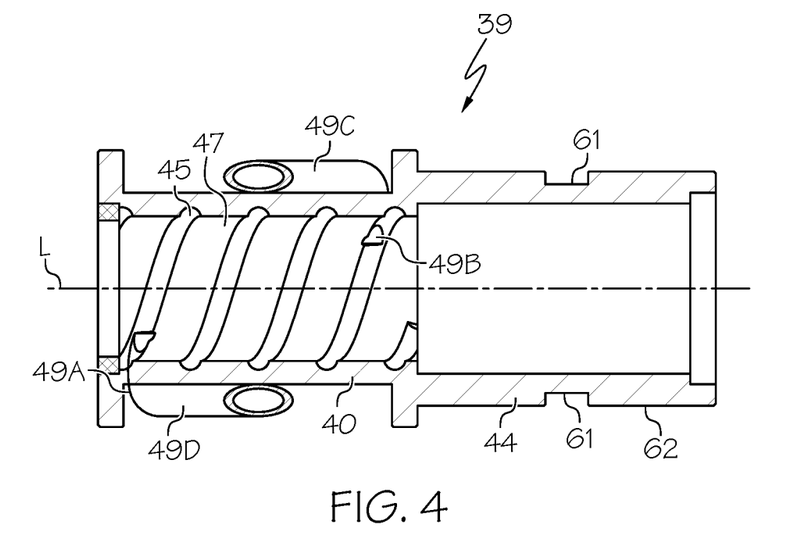
FIG. 4 schematically depicts a cross-section elevation view of a ball nut of the ball screw centering device, according to one or more embodiments shown and described herein.

The ball screw centering device 10 further includes a first nut 39 and a second nut 41. The first nut 39 and the second nut 41 engage the first side ball track 30 and the second side ball track 34, respectively. As shown in FIG. 4, the first nut 39 is illustrated. It should be appreciated that the first nut 39 and the second nut 41 are identical to one another, but oriented in opposite directions along the longitudinal axis L and the rotatable shaft 24. Accordingly, the description of the first nut 39 provided herein is equally applicable to the second nut 41. The first nut 39 includes a track portion 40 and an extension portion 44 extending from the track portion 40. The extension portion 44 includes a recess 61 formed therein. In embodiments, the recess 61 extends around an entire outer circumference 62 of the extension portion 44. In other embodiments, the recess 61 is formed one or more points along the outer circumference 62 of the extension portion. A spiral groove 45 is formed in an interior surface 47 of the track portion 40. The spiral groove 45 corresponds to the spiral groove 30A of the first side ball track 30. Thus, the spiral grooves 45 of the first nut 39 cooperate with the spiral groove 30A the first side ball track 30 to define a passage through which a first set of ball bearings traverse for translating the rotatable shaft 24 along the longitudinal axis L, as discussed in more detail herein. As shown in FIG. 4, an inlet 49A and an outlet 49B is provided in the spiral grooves 45 to permit the first set of ball bearings to move through the passage. The inlet 49A and the outlet 49B are interconnected by a first recirculating ball tube 49C and a second recirculating ball tube 49D. Although not shown, a second inlet and a second outlet may be provided for facilitating recirculation and transfer of the first seat of ball bearings. Similarly, the track portion 40 of the second nut 41 includes a spiral groove that cooperates with the spiral groove 34A of the second side ball track 34 to define a passage through which a second set of ball bearings traverse for translating the rotatable shaft 24 along the longitudinal axis L. In addition, the second nut 41 similarly includes one or more inlets, outlets, and recirculating ball tubes for circulating the second set of ball bearings through the passage of the second nut.

Referring again to FIGS. 1 and 2, the ball screw centering device 10 further includes a first nut housing 38 connected to the stationary mold block 14. The first nut housing 38 includes a passage 37 that the first side ball track 30 extends through. The ball screw centering device 10 further includes a second nut housing 42 connected to the distal mold block 18. The second nut housing 42 includes a passage 43 that second side ball track 34 extends through. As shown, the first nut 39 partially extends through the passage 37 defined by the first nut housing 38. Specifically, the first nut 39 is positioned such that the extension portion 44 of the first nut 39 extends through the passage 37 of the first nut housing 38. Similarly, the second nut 41 partially extends through the passage 43 defined by the second nut housing 42. Specifically, the second nut 41 is positioned such that the extension portion of the second nut 41 extends through the passage 43 of the second nut housing 42.

In embodiments, a first sleeve 46 is connected to and extends between the center bearing housing 20 and the first nut housing 38 to circumscribe an exposed portion of the first side ball track 30 and the track portion 40 of the first nut 39. The first sleeve 46 is positionable between an unexpanded position (FIG. 1) and an expanded position (FIG. 2). In embodiments, a second sleeve 48 is connected to and extends between the center bearing housing 20 and the second nut housing 42 to circumscribe an exposed portion of the second side ball track 34 and the track portion of the second nut 41. Similar to the first sleeve 46, the second sleeve 48 is positionable between an unexpanded position (FIG. 1) and an expanded position (FIG. 2). It should be appreciated that the first sleeve 46 and the second sleeve 48 are provided to prevent debris from entering the spiral groove 30A formed in the first side ball track 30 and the spiral groove of the second side ball track 34, as well as entering the other components of the ball screw centering device 10. However, in embodiments, the ball screw centering device 10 may not include the first sleeve 46 and the second sleeve 48.

In embodiments, a sleeve retaining member 51 is provided and extends between the first sleeve 46 and the second sleeve 48. With more particularity, the sleeve retaining member 51 includes an arm 51A extending along the longitudinal axis L, a first clip 51B slidably movable along the arm 51A along the longitudinal axis L and a second clip 51C slidably movable along the arm 51A along the longitudinal axis L. The arm 51A extends through a retaining body 51D mounted to the center bearing housing 20 so as to fixedly space the arm 51A relative to the center bearing housing 20. The first clip 51B is removably secured to the first sleeve 46, and the second clip 51C is removably secured to the second sleeve 48. When secured, the first clip 51B and the second clip 51C prevent the first sleeve 46 and the second sleeve 48 from collapsing onto the rotatable shaft 24 and onto the first nut 39 and the second nut 41, respectively.

The first end 32 of the rotatable shaft 24 is positioned through a passage in a first side tube holder 50, which is connected to the stationary mold block 14 at a distance from the first nut housing 38. The passage of the first side tube holder 50 slidably receives a portion of the first side ball track 30. In addition, a first tube 52 is provided having a first end 52A connected to an interior surface of the extension portion 44 of the first nut 39 and extends to an opposite second end 52B that is connected to the passage of the first side tube holder 50. The first tube 52 has a hollow passage that at least partially circumscribes the first side ball track 30 with enough clearance to allow the first side ball track 30 to move freely in the passage of the first tube 52.

The second end 36 of the rotatable shaft 24 is positioned through a passage in a second side tube holder 54, which is connected to the distal mold block 18 at a distance from the second nut housing 42. The passage of the second side tube holder 54 slidably receives a portion of the second side ball track 34. In addition, a second tube 56 is provided having a first end 56A connected to an interior surface of the extension portion of the second nut 41 and extends to an opposite second end 56B that is connected to the passage of the second side tube holder 54. The second tube 56 has a hollow passage that at least partially circumscribes the second side ball track 34 with enough clearance to allow the second side ball track 34 to move freely in the passage of the second tube 56.

In embodiments, the a first cap 32A is provided at a first end 24A of the rotatable shaft 24 proximate the first side tube holder 50 and a second cap 32B is provided at an opposite second end 24B of the rotatable shaft 24 proximate the second side tube holder 54. The first cap 32A and the second cap 32B prevent the ball bearings from falling out of engagement with the first side ball track 30 and the second side ball track 34 of the rotatable shaft 24 during translation of the rotatable shaft 24 along the longitudinal axis L.

Figure 5A:
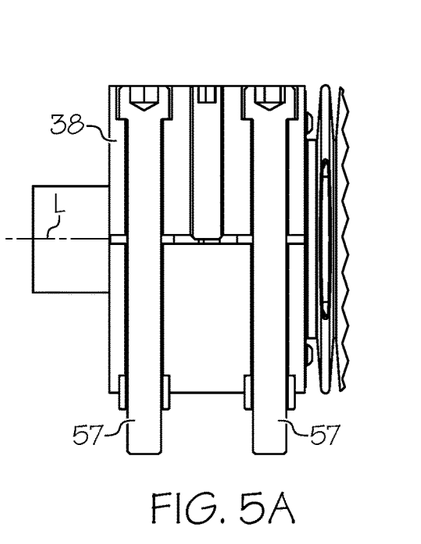
FIG. 5A schematically depicts a side view of a nut housing of the ball screw centering device, according to one or more embodiments shown and described herein.
Figure 5B:
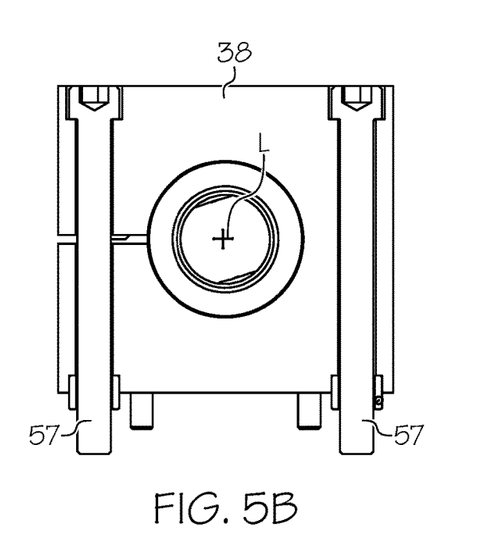
FIG. 5B schematically depicts an end view of the nut housing of the ball screw centering device, according to one or more embodiments shown and described herein.
Figure 5C:
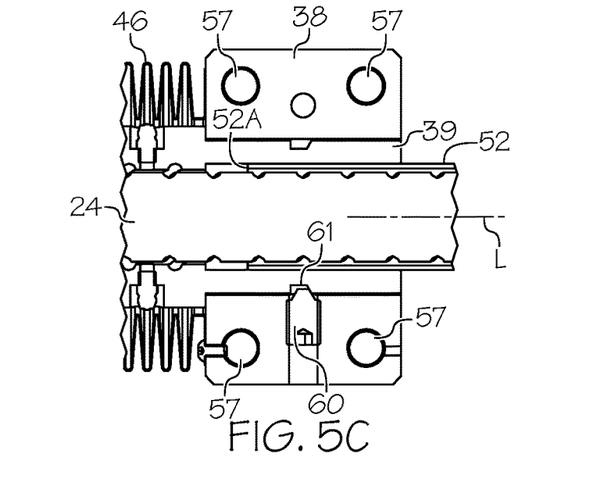
FIG. 5C schematically depicts a cross-section top view of the nut housing of the ball screw centering device, according to one or more embodiments shown and described herein.

Referring now to FIGS. 5A-5C, details of the first nut housing 38 are shown. Although only the first nut housing 38 is illustrated and discussed in detail herein, it should be appreciated that the first nut housing 38 is identical to the second nut housing 42. Accordingly, the description related to the first nut housing 38 is equally applicable to the second nut housing 42. Specifically, the first nut housing 38 clamps onto the first nut 39 to secure the first nut 39 onto the stationary mold block 14 using block fasteners 57. Similarly, the second nut housing 42 clamps onto the second nut 41 to secure the second nut 41 onto the distal mold block 18 using block fasteners 57. In addition, as shown in FIGS. 5A and 5C, one or more set screws 60 are provided to extend through the first nut housing 38 and engage the recess 61 formed in the extension portion 44 of the first nut 39. It should be appreciated that one or more set screws 60 are also provided to extend through the second nut housing 42 and engage a recess formed in the extension portion of the second nut 41.

Operation of the injection molding apparatus 8 is now described in more detail with respect to the FIGS. 1 and 2. As the distal mold block 18 is translated in the direction of arrow A1 (e.g., by a moving platen of an injection molding machine (not shown) on which the injection molding apparatus 8 is installed), linear translation of the second nut 41 in the direction of arrow A1 rotates the rotatable shaft 24 in a first angular direction. Because the spiral groove 34A and the spiral groove 30A are oriented in opposite angular directions, rotation of the rotatable shaft 24 causes the first nut 39 to translate in the direction of arrow A2 (i.e., opposite the direction of arrow A1). However, because the first nut 39 is fixed to a non-movable block (i.e., the stationary mold block 14) and due to the interaction of the center flange 26 of the shaft 24 with the first nut 39, the center mold block 16 is pushed away (i.e., the center mold block 16 translates in the direction of arrow A1) from the stationary mold block 14. The separation of the distal mold block 18 from the center mold block 16, and the center mold block 16 from the stationary mold block 14 allow for the molded parts to be removed. Once the molded parts are removed, the ball screw centering device 10 performs a reverse operation to rotate the rotatable shaft 24 in a second angular direction, opposite to that of the first angular direction, and return the distal mold block 18 to be in contact with the center mold block 16, and the center mold block 16 to be in contact with the stationary mold block 14.

From the above, it is to be appreciated that defined herein is an injection molding apparatus and ball screw centering device for moving a center mold block relative to a stationary mold block, and a distal mold block relative to the center mold block to simultaneously form and remove two injection molded parts being formed. The ball screw centering device is coupled to the stationary mold block, center mold block, and the distal mold block.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An injection molding apparatus comprising:
   a stack mold tool comprising:
     a stationary mold block;
     a center mold block movable between an open position and a closed position relative to the stationary mold block; and
     a distal mold block movable between an open position and a closed position relative to the center mold block; and
   a ball screw centering device comprising:
     a center bearing housing connected to the center mold block;
     a rotatable shaft extending through a channel of the center bearing housing and rotatably mounted to the center bearing housing, the rotatable shaft having a first side ball track and a second side ball track;
     a first nut coupled to the stationary mold block, the first nut including a track portion cooperating with the first side ball track to define a passage for a first set of ball bearings to traverse;
     a second nut coupled to the distal mold block, the second nut including a track portion cooperating with the second side ball track to define a passage for a second set of ball bearings to traverse;
     a first nut housing fixed to the stationary mold block; and
     a first sleeve connected to and extendable between the center bearing housing and the first nut housing to circumscribe an exposed portion of the first side ball track and an exposed portion of the first nut between the center bearing housing and the first nut housing, the first sleeve being positionable between an unexpanded position and an expanded position.

2. The injection molding apparatus of claim 1, wherein the rotatable shaft has a center flange positioned in the center bearing housing.

3. The injection molding apparatus of claim 2, wherein the first side ball track extends from the center flange and across a portion of the stationary mold block.

4. The injection molding apparatus of claim 2, wherein the second side ball track extends from the center flange and across a portion of the distal mold block.

5. The injection molding apparatus of claim 1, further comprising:
   a second nut housing fixed to the distal mold block, the second side ball track and an extension portion of the second nut extending through the second nut housing, the extension portion of the second nut extending from the track portion of the second nut,
   wherein the first side ball track and an extension portion of the first nut extend through the first nut housing, and the extension portion of the first nut extends from the track portion of the first nut.

6. The injection molding apparatus of claim 5, wherein the ball screw centering device further comprises:
   a first side tube holder connected to the stationary mold block at a distance from the first nut housing and having a passage for slidably receiving a first end of the rotatable shaft;
   a first tube having a first end connected to the first nut housing and extending to an opposite second end of the first tube that is connected to the first side tube holder, the first tube having a hollow passage that at least partially circumscribes the first side ball track;
   a second side tube holder connected to the distal mold block at a distance from the second nut housing and having a passage for slidably receiving an opposite second end of the rotatable shaft;
   a second tube having a first end connected to the second nut housing and extending to an opposite second end of the second tube that is connected to the second side tube holder, the second tube having a hollow passage that at least partially circumscribes the second side ball track.

7. The injection molding apparatus of claim 1, wherein:
   the center mold block has a pair first mold halves;
   the stationary mold block has a second mold half corresponding to one of the first mold halves of the pair of mold halves of the center mold block; and
   the distal mold block has a second mold half corresponding to the other first mold half of the pair of first mold halves of the center mold block.

8. The injection molding apparatus of claim 5, further comprising:
   a second sleeve connected to and extending between the center bearing housing and the second nut housing to circumscribe an exposed portion of the second side ball track and an exposed portion of the second nut between the center bearing housing and the second nut housing, the second sleeve being positionable between an unexpanded position and an expanded position.

9. The injection molding apparatus of claim 1, wherein the first nut and the second nut each includes an inlet and an outlet with a recirculating ball tube extending between the inlet and the outlet that transfers a respective one of the first set of ball bearings and the second set of ball bearings from the outlet to the inlet as a respective one of the first side ball track and the second side ball track move through a respective one of the first nut and the second nut.

10. The injection molding apparatus of claim 1, wherein the first side ball track and second side ball track each define a spiral groove that spirals amount a length of the first side ball track and a second side ball track, wherein the spiral groove of the first side ball track spirals in a first direction and the spiral groove of the second side ball track spirals in an opposite second direction.

11. A ball screw centering device comprising:
a center bearing housing to be connected to a center mold block;
a rotatable shaft extending through a channel of the center bearing housing and rotatably mounted to the center bearing housing, the rotatable shaft having a first side ball track and a second side ball track;
a first nut to be coupled to a stationary mold block, the first nut including a track portion cooperating with the first side ball track to define a passage for a first set of ball bearings to traverse;
a second nut to be coupled to a distal mold block, the second nut including a track portion cooperating with the second side ball track to define a passage for a second set of ball bearings to traverse;
a first nut housing to be fixed to a stationary mold block; and
a first sleeve to be connected to and extendable between the center bearing housing and the first nut housing to circumscribe an exposed portion of the first side ball track and an exposed portion of the first nut between the center bearing housing and the first nut housing, the first sleeve being positionable between an unexpanded position and an expanded position.

12. The ball screw centering device of claim 11, wherein the rotatable shaft has a center flange positioned in the center bearing housing.

13. The ball screw centering device of claim 12, wherein the first side ball track extends from the center flange and across a portion of a stationary mold block.

14. The ball screw centering device of claim 12, wherein the second side ball track extends from the center flange and across a portion of the distal mold block.

15. The ball screw centering device of claim 11, further comprising:
a second nut housing to be fixed to a distal mold block, the second side ball track and an extension portion of the second nut extending through the second nut housing, the extension portion of the second nut extending from the track portion of the second nut,
wherein the first side ball track and an extension portion of the first nut extend through the first nut housing, and the extension portion of the first nut extends from the track portion of the first nut.

16. The ball screw centering device of claim 15, wherein the ball screw centering device further comprises:
a first side tube holder to be connected to the stationary mold block at a distance from the first nut housing and having a passage for slidably receiving a first end of the rotatable shaft;
a first tube having a first end connected to the first nut housing and extending to an opposite second end of the first tube that is connected to the first side tube holder, the first tube having a hollow passage that at least partially circumscribes the first side ball track;
a second side tube holder to be connected to the distal mold block at a distance from the second nut housing and having a passage for slidably receiving an opposite second end of the rotatable shaft;
a second tube having a first end connected to the second nut housing and extending to an opposite second end of the second tube that is connected to the second side tube holder, the second tube having a hollow passage that at least partially circumscribes the second side ball track.

17. The ball screw centering device of claim 15, further comprising:
a first sleeve connected to and extending between the center bearing housing and the first nut housing to circumscribe an exposed portion of the first side ball track and an exposed portion of the first nut between the center bearing housing and the first nut housing, the first sleeve being positionable between an unexpanded position and an expanded position; and
a second sleeve connected to and extending between the center bearing housing and the second nut housing to circumscribe an exposed portion of the second side ball track and an exposed portion of the second nut between the center bearing housing and the second nut housing, the second sleeve being positionable between an unexpanded position and an expanded position.

18. The ball screw centering device of claim 11, wherein the first nut and the second nut each includes an inlet and an outlet with a recirculating ball tube extending between the inlet and the outlet that transfers a respective one of the first set of ball bearings and the second set of ball bearings from the outlet to the inlet as a respective one of the first side ball track and the second side ball track move through a respective one of the first nut and the second nut.

19. The ball screw centering device of claim 11, wherein the first side ball track and second side ball track each define a spiral groove that spirals amount a length of the first side ball track and a second side ball track, wherein the spiral groove of the first side ball track spirals in a first direction and the spiral groove of the second side ball track spirals in an opposite second direction.

20. A method comprising:
translating a distal mold block of a stack mold tool in a first longitudinal direction to rotate a rotatable shaft of a ball screw centering device coupled to the stack mold tool in a first rotation direction, wherein:
a first nut housing of the ball screw centering device is fixed to a stationary mold block of the stack mold tool;
a center bearing housing of the ball screw centering device is fixed to a center mold block of the stack mold tool;
a second nut housing of the ball screw centering device is fixed to the distal mold block of the stack mold tool; and
a first sleeve is connected to and extendable between the center bearing housing and the first nut housing to circumscribe an exposed portion of a first side ball track and an exposed portion of a first nut between the center bearing housing and the first nut housing, the first sleeve being positionable between an unexpanded position and an expanded position.

* * * * *